Patented Aug. 26, 1941

2,254,124

UNITED STATES PATENT OFFICE 2,254,124

ORGANIC COMPOUND OF QUINQUEVALENT PHOSPHORUS

Philip Greeley Stevens, Montreal, Quebec, Canada, and Howard Sinclair Turner, Swarthmore, Pa., assignors to E. I. du Pont de Nemours & Company, Wilmington, Del., a corporation of Delaware No Drawing. Application June 5, 1939, Serial No. 277,562

29 Claims. (Cl. 260—500)

This invention relates to new organic derivatives of phosphorus and more particularly to new tertiary alpha-hydroxy phosphonic acids of at least ten carbon atoms and derivatives thereof.

This invention has as an object the preparation of new and useful organic derivatives of phosphorus. A further object is the preparation of aliphatic derivatives of phosphorus which contain a carbon-phosphorus bond. A still further object is the preparation of tertiary alpha-hydroxyphosphonates which have the property of modifying surface tension. A still further object is the preparation of novel derivatives of tertiary alpha-hydroxyphosphonic acids which imparts unexpected properties to lubricating oils. Other objects will appear hereinafter.

These objects are accomplished by the following invention which comprises reacting a bromide or chloride of tervalent phosphorus, all of the valences of which are attached to other atoms by single bonds, with a ketone of at least ten carbon atoms having on the carbonyl carbon at least one open chain aliphatic radical, preferably of at least three carbon atoms, preferably in the presence of a low molecular weight organic monocarboxylic acid or anhydride thereof. In the case of the reaction with phosphorus trichloride or tribromide, the resulting product is desirably hydrolysed with water or aqueous alkali. The invention also includes the products of the reaction, namely the dibasic tertiary alpha-hydroxyphosphonic acids and their mono- and diesters and salts, the monobasic tertiary alpha-hydroxyphosphonic acids, salts, and esters thereof, and the phosphine oxide derivatives.

The tertiary alpha-hydroxyphosphonic acids of this invention are obtained by reacting a ketone of at least ten carbon atoms, in which at least one completely open-chain aliphatic radical preferably of three or more carbon atoms is attached to the carbonyl group, with phosphorus trichloride or tribromide in the presence of a low molecular weight carboxylic acid or carboxylic acid anhydride. The tertiary alpha-hydroxyphosphonic monobasic acids and phosphine oxide derivatives are obtained by the reaction of mono- or dichlorophosphines or mono- or dibromophosphines on ketones of ten or more carbon atoms in which at least one open-chain aliphatic radical preferably of three or more carbon atoms is attached to the carbonyl group. The esters of tertiary alpha-hydroxyphosphonic acids are obtained by reacting alcohols with the intermediate phosphonyl chlorides or bromides resulting from the reaction of phosphorus trichloride or tribromide, or a dichlorophosphine or dibromophosphine on ketones of ten or more carbon atoms in which at least one completely open-chain aliphatic radical preferably of three or more carbon atoms is attached to the carbonyl group.

The invention is not to be restricted because of the following theoretical explanation, the probable mechanism of the reaction between ketones of ten or more carbon atoms, in which at least one open-chain aliphatic radical preferably of three or more carbon atoms is attached to the carbonyl group, and phosphorus trichloride is the formation of intermediate cyclic phosphonic acid chlorides which by the action of alcohols or phenols are converted to esters. The proposed mechanism of the reaction may be illustrated as follows:

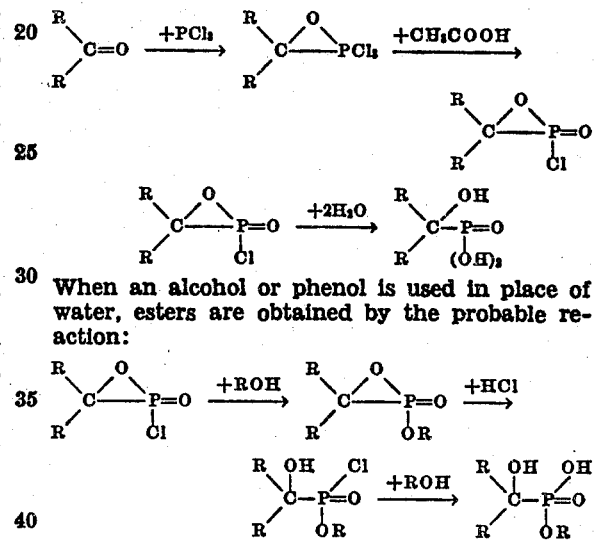

When an alcohol or phenol is used in place of water, esters are obtained by the probable reaction:

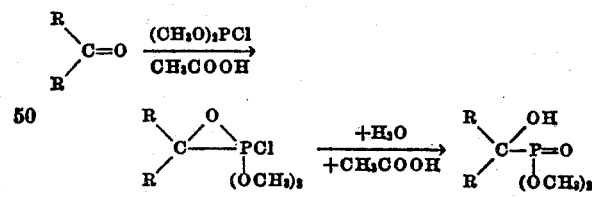

If, in the reaction of the ketone, dimethoxychlorophosphine is substituted for the phosphorus trichloride, the reaction mechanism is probably as follows:

$$\underset{R}{\overset{R}{\diagdown}}C=O \xrightarrow[CH_3COOH]{(CH_3O)_2PCl}$$

$$\underset{R}{\overset{R}{\diagdown}}\overset{O}{\underset{(OCH_3)_2}{C\!-\!PCl}} \xrightarrow[+CH_3COOH]{+H_2O} \underset{R}{\overset{R}{\diagdown}}\overset{OH}{\underset{(OCH_3)_2}{C\!-\!P=O}}$$

This is a very satisfactory method for making the neutral esters.

If, in the reaction of the ketone, n-butyldichlorophosphine (n-$C_4H_9PCl_2$) is substituted for the phosphorus trichloride, the reaction mechanism is probably as follows:

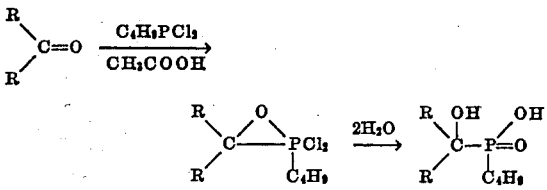

When alcohols or phenols are reacted with the cyclic phosphonic acid chloride, esters are formed.

The present invention is generic to organic derivatives of quinquevalent phosphorus wherein one valence of the phosphorous is attached to an organic radical of at least ten carbon atoms through a carbon atom which is also attached to a hydroxyl group and to two other carbons at least one of which forms part of an open-chain aliphatic radical, two other valences of the phosphorus being attached to one oxygen atom. These may also be generically described as tertiary alpha-hydroxyphosphonates of the formula

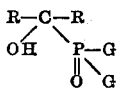

wherein R—C—R contains at least ten carbon atoms, at least one of the organic radicals R is an aliphatic radical, G is OH, OM, R, or OR, and M is hydrogen or a salt-forming atom or group. The preferred sub-class is that of tertiary alpha-hydroxy dibasic phosphonic acids, i. e., derivatives of quinquevalent phosphorus wherein the phosphorus is attached to a carbinol, C—O—H, group which is attached through carbon to two organic radicals, at least one of which is an open-chain aliphatic radical, two valences of the phosphorus are attached to one oxygen and two valences are satisfied by hydroxyls, and the salts, preferably water-soluble, of these acids.

Other sub-classes are the esters of these dibasic acids, the monobasic acids, wherein one hydroxyl of the dibasic acids is replaced by an organic radical attached to the phosphorus by a C—P linkage, e. g., an aryl or alkyl radical, the esters and salts of the monobasic acids, and the phosphine oxide derivatives, wherein both hydroxyls of the dibasic acids are replaced by organic radicals, e. g., alkyl or aryl, attached to the phosphorus by C—P linkages.

The more detailed practice of the invention is illustrated by the following examples, wherein parts given are by weight. There are of course many forms of the invention other than these specific embodiments.

EXAMPLE I

*Disodium 8-hydroxy-8-pentadecanephosphonate*

A mixture of 118 parts of pentadecanone-8, 156 parts of phosphorus trichloride, and 90 parts of glacial acetic acid are placed in a reaction vessel closed with a calcium chloride vent and allowed to stand for 2 days. The reaction mixture is then evacuated to 5 mm. and held at 70° C. for 2 hours. The residue is treated with 3000 parts of water and evaporated to dryness. The yield of free phosphonic acid amounts to 178 parts by weight. The sodium salt is prepared by dissolving the free acid in dilute ethanol and neutralizing with a dilute aqueous sodium hydroxide solution. Water solutions of disodium 8-hydroxy-8-pentadecanephosphonate foam readily. The sodium salt is an effective agent for promoting the wetting of cotton textiles and also displays mold inhibiting action.

EXAMPLE II

*Disodium 12-hydroxy-12-tricosanephosphonate*

Sufficient ether is added to a mixture of 338 parts of tricosanone-12, 207 parts of phosphorus trichloride, and 180 parts of glacial acetic acid to form a homogeneous solution. The reaction mixture is allowed to stand at room temperature for one week and then subjected to a vacuum of 5 mm. and a temperature of 100° C. for 2 hours. The residue is boiled with water for one-half hour and then neutralized with a dilute aqueous sodium hydroxide solution. On evaporation of the water, 470 parts of sodium 12-hydroxy-12-tricosanephosphonate is obtained. The sodium salt is a contact insecticide, an effective dry-cleaning soap, and an effective mold inhibitor. Dilute aqueous solutions of the sodium salt impart a softened effect to viscose rayon. The free phosphonic acid is regenerated by treating the sodium salt with dilute hydrochloric acid and then extracting the mixture with petroleum ether. The petroleum ether solution is then washed free of hydrochloric acid with a brine solution. The free phosphonic acid is obtained by evaporation of the petroleum ether. The free phosphonic acid, which has the consistency and color of honey, is an efficient metal deactivator for motor fuels.

EXAMPLE III

*Disodium 2-hydroxy-2-tridecanephosphonate*

A mixture of 150 parts of tridecanone-2, 156 parts of phosphorus trichloride, and 137 parts of glacial acetic acid is allowed to stand in the absence of moisture at room temperature for 8 days. Volatile products are removed under vacuum on the steam bath and the residue boiled with water and subsequently neutralized with a dilute aqueous sodium hydroxide solution. The aqueous solutions of this disodium 2-hydroxy-2-tridecanephosphonate foam readily and display detergent action.

EXAMPLE IV

*Dipotassium 1-xylyl-1-hydroxy-1-octadecanephosphonate*

Fifteen parts of xylyl heptadecyl ketone, 13.7 parts of phosphorus trichloride, and 9 parts of glacial acetic acid are combined at room temperature and allowed to stand for 5 days with occasional agitation. The product is poured into 300 parts of water and stirred rapidly at the boiling point for one-half hour. The free acid thus produced separates as large curds and is washed free of phosphate and chloride ions by decantation. The free acid is neutralized with a dilute aqueous potassium hydroxide solution. The potassium salt is an effective dry-cleaning soap and displays contact insecticidal action. Dilute aqueous solutions of the potassium salt foam readily, display detergent action, and impart softening properties to viscose rayon.

By substituting biphenyl heptadecyl ketone and phenoxyphenyl heptadecyl ketone for the xylyl heptadecyl ketone in the preceding example, dipotassium 1-biphenyl-1-hydroxy-1-octadecanephosphonate and dipotassium 1 - phenoxy - phenyl-1-hydroxy-1-octadecanephosphonate are obtained. Dilute aqueous solutions of these potassium salts foam readily and impart softening properties to viscose rayon.

EXAMPLE V

*Disodium hydroxyphosphonate derivative of hydrogenated oiticica oil*

To a mixture of 15 parts of hydrogenated oiticica oil, 11 parts of phosphorus trichloride, and 11 parts of glacial acetic acid sufficient chloroform is added to give a homogeneous solution. After standing for 5 days with occasional agitation, the mixture is poured into boiling water and stirred until all the chloroform has evaporated. The resulting acid is neutralized with a dilute aqueous sodium hydroxide solution. Dilute aqueous solutions of the sodium salt are effective softening agents for cotton textiles.

When oiticica oil is treated in a similar fashion with phosphorus trichloride and the product hydrolyzed and neutralized with a dilute aqueous sodium hydroxide solution, a water-soluble surface-active product is obtained which is an effective textile softening agent.

EXAMPLE VI

*Trisodium salt of 12-hydroxy-12-phosphonostearic acid*

A mixture of 15 parts of 12-ketostearic acid, 11 parts of phosphorus trichloride, and 13 parts of glacial acetic acid is combined in a reaction vessel closed with a calcium chloride vent and sufficient chloroform added to produce a homogeneous solution. After standing one week at room temperature, the mixture is poured into 1000 parts of water, stirred, and boiled. The mixture is then evaporated to small volume, and the soft, wax-like phosphonic acid which separates is washed several times with warm water. After drying, the free acid is dissolved in dilute ethanol and neutralized with a dilute aqueous sodium hydroxide solution. The sodium salt is an effective mold inhibitor and is a softening agent for viscose rayon.

When 12-ketostearin is treated with phosphorus trichloride in a similar manner and the resulting phosphonic acid converted to a sodium salt, a surface-active product is obtained which softens cotton fabrics.

In the process of the present invention, any ketone of at least ten carbon atoms wherein at least one and preferably both of the radicals attached to the carbonyl carbon are completely open-chain aliphatic radicals may be reacted with any tervalent phosphorus compound wherein at least one of the three phosphorus valences is attached to chlorine or bromine, i. e., to a halogen of atomic weight between 35 and 80, all the valences of the phosphorus being attached to different atoms, i. e., singly bonded.

In addition, therefore, to the ketones of the examples, the invention is applicable to 10-ethyltetradecan-7-one; 2-methylhexadecan-5-one; pentadecan-9-one; 5-ethyltetradecan-8-one; 7-methylpentadecan-9-one; 2-methylheptadecan-4-one; 2-methyldodecan-4-one; 2,8,12-trimethyltridecan-4-one; 2-methyl-8-ethyldodecan-5-one; 5-ethylhexadecan-8-one; 3-ethyltetradecan-6-one; 3,9-diethyltridecan-6-one; 9-ethyltridecan-6-one; 6-propyl-8-ethyldodecan-5-one; 9-ethyl-5-methyltridecan-6-one; pentadecan-8-one; pentadecan-7-one; pentadecan-6-one; pentadecan-5-one; pentadecan-4-one; pentadecan-3-one; pentadecan-2-one; 2-methyltetradecan-8-one; 3-ethyltridecan-7-one; 4-propyldodecan-6-one; 5-butylundecan-4-one; 6-amyldecan-3-one; 7-hexylnonan-2-one; 3-ethyltridecan-8-one; 4-propyldodecan-7-one; 5-butylundecan-6-one; 6-amyldecan-4-one; 7-hexylnonan-3-one; 5-butylundecan-8-one; 6-amyldecan-7-one; 7-hexylnonan-5-one; tridecan-7-one; dodecan-6-one; 7-ethyl-2-methylundecan-4-one; 3-ethyldecan-6-one; 3-ethylundecan-6-one; undecan-6-one; undecan-4-one; 5-ethylnonan-2-one; 2-methylundecan-5-one; heptadecan-9-one; heptadecan-6-one; heptadecan-8-one; heptadecan-7-one; heptadecan-5-one; heptadecan-4-one; heptadecan-3-one; 5-ethylpentadecan-6-one; 3-ethylpentadecan-4-one; 5-ethylpentadecan-8-one; 2,4,10,12-tetramethyltridencan-7-one; 3-ethylpentadecan-6-one; 2-methylhexadecan-5-one; 3,7-dimethylpentadecan-10-one; nonadecan-10-one; nonadecan-9-one; nonadecan-8-one; nonadecan-7-one; nonadecan-6-one; nonadecan-5-one; nonadecan-4-one; nonadecan-3-one; nonadecan-2-one; 5,11-diethylpentadecan-8-one; 5-ethylheptadecan-8-one; 5-ethylheptadecan-6-one; 2-methyloctadecan-5-one; 2,6-dimethylheptadecan-10-one; 2,6-dimethyl-13-ethylpentadecan-10-one; 2,6,10,14-tetramethylpentadecan-8-one; heneicosan-11-one; tricosan-12-one; pentacosan-13-one; heptacosan-14-one; nonacosan-15-one; hentriacontan-16-one; pentatriacontan-18-one; dodec-11-en-2-one, etc. It is frequently desirable to employ mixtures of the above ketones as starting materials for reaction with the phosphorus halides. A suitable mixture of ketones are those ketones obtained by ketonizing the coconut oil acids which range in carbon content from 6 to 18 carbon atoms. Other suitable ketones are the ketones which result by condensing fatty acids with aromatic hydrocarbons, such as undecyl phenyl ketone, tridecyl xylyl ketone, pentadecyl biphenyl ketone, heptadecyl naphthyl ketone, etc.

The invention is generic to the use of phosphorus trichloride and tribromide, monobromophosphines, monochlorophosphines, dibromophosphines and dichlorophosphines, including butyldichlorophosphine, phenyldichlorophosphine, dodecyldichlorophosphine, diphenylmonochlorophosphine, diamylmonochlorophosphine, dimethoxychlorophosphine, dibeta-naphthyloxychlorophosphine, dicresyloxychlorophosphine, dioctyloxychlorophosphine, dicyclohexyloxychlorophosphine, mono-ethoxydichlorophosphine, mono-phenoxydichlorophosphine, monodecyloxydichlorophosphine, etc.

It is preferred to carry out the reaction between the ketones with the appropriate phosphorus halide in the presence of acetic acid or acetic anhydride, but any low molecular weight carboxylic acid or anhydride may be used which does not react directly with the phosphorus halide used under the conditions of the reaction. Acetic anhydride is preferred when the intermediate phosphonyl chloride is desired, as is the case in the preparation of the esters. It is recognized that the acid or anhydride employed as the medium in which the reaction takes place functions not only as a solvent but is chemically involved in the reaction, probably by reacting with a loose complex formed between the phosphorus trichloride or the chlorophosphine and the ketone. In this manner higher yields of the final product are obtained. However, the presence of such an acid or anhydride is not essential, since low yields of tertiary alphahydroxyphosphonic acid derivatives may be obtained merely by combining the phosphorous halide with the ketone and hydrolyzing the mixture directly with water.

Wide variations may be used in the relative proportions of reactants employed in the synthesis of the tertiary alphahydroxyphosphonic acid derivatives of this invention. In general, molecularly equivalent quantities of the ketone and the phosphorous halide are used, but excess proportions of either reactant may be used. It is preferred, however, to use molecularly equivalent quantities of ketone and acetic anhydride, together with a slight excess of the phosphorous halide. When acetic acid is employed, at least two molecular quantities are desirable. The reaction temperature may vary widely over a considerable range, the upper limit of which is chiefly determined by the temperature at which the acid or anhydride employed begins to react with the phosphorus trichloride or the chlorophosphine directly. The preferred temperature for optimum results with acetic anhydride is the range of 20–50° C. When using benzoic acid, a higher temperature such as 150° C. is sometimes desirable. Higher temperatures are sometimes effective in bringing about reaction with relatively inert ketones, but at the same time frequently result in a darkening and a slight resinification of the reaction mixture. In general, the chlorophosphines react more slowly than the phosphorus trichloride and are more expensive intermediates than the phosphorus trichloride, and for these reasons phosphorus trichloride is the preferred reagent. The esterification reactions of the intermediate phosphonyl chlorides are usually carried out at temperatures of about 100° C., but higher temperatures may be employed. When volatile reactants, such as methanol, etc., are used at these elevated temperatures, it is usually desirable to carry out the reaction in a closed vessel.

The phosphonic acids may be esterified with any non-acidic esterfiable organic hydroxyl compound, i. e., with alcohols and phenols including methanol, ethanol, isobutanol, hexan-1-ol, 2-ethylhexan-1-ol, dacan-1-ol, dodecan-1-ol, tetradecan-1-ol, hexadecan-1-ol, octadecan-1-ol, octadec-9-en-1-ol, pentadecan-8-ol, a mixture of alcohols resulting from the catalytic hydrogenation or sodium reduction of natural oils such as coconut oil, sperm oil, etc.; a mixture of alcohols obtained in the catalytic synthesis of methanol from carbon oxides and hydrogen, phenols, cresols, naphthols, benzyl alcohol, cyclohexanol, naphthenyl alcohol, etc. The aliphatic alcohols are preferred to the aromatic phenolic compounds for the preparation of esters.

In many cases, it is not necessary to obtain the products of this invention in their pure state. In such cases, the procedure to be followed consists merely in the water hydrolysis of the crude reaction mixture, followed if desired by neutralization of its acidity with any alkaline agent. However, if pure products are desired, it is preferable first to remove the volatile reaction constituents such as acetic anhydride, acetic acid, acyl chloride, unchanged phosphorus trichloride, etc., by the application of a vacuum and mild heating to the reaction mixture. Subsequent to water hydrolysis, the tertiary alpha-hydroxyphosphonic acids may be isolated and purified by recrystallization of salts of low solubility such as the lead and barium salts.

The phosphonic acids described herein may be used as such, but generally they are converted to their alkali metal salts by neutralization with an alkali metal hydroxide such as sodium or potassium hydroxide, or ammonia; calcium and magnesium salts, and in fact any salt, may also be prepared and used. The soluble salts are, of course, of greatest utility. Salts of the phosphonic acids described herein may also be made from amines, e. g., dimethylamine, ethylamine, diethanolamine, triethanolamine, butylamine, glucamine, methylglucamine, pyridine, piperidine, cyclohexylamine, aniline, toluidine, ethylenediamine, hexamethylenediamine, etc., and from quaternary ammonium bases, e. g., trimethyl ammonium hydroxide.

The products of this invention are essentially aliphatic in nature. In fact, in the preferred embodiment of the invention the products are entirely aliphatic in nature and in general tend to be noncrystalline or low melting in character, thereby enhancing their compatibility characteristics with aliphatic hydrocarbons of the motor fuel and lubricant types. The predominantly aliphatic properties of the higher molecular weight compounds containing a water solubilizing phosphonate group renders them similar to the soaps of the higher molecular weight fatty acids which are dependent upon an aliphatic "lipophile" radical for their capillary active characteristics.

The tertiary alpha-hydroxyphosphonates which are derived from ketones are preferred to the non-tertiary alpha-hydroxyphosphonates which are derived from aldehydes because of the greater availability and stability of the ketones.

The products of this invention preferably those of twelve or more carbon atoms, which by reason of a free acid group or its equivalent salt, are soluble in water, belong to the class of surface-active or capillary active materials in that they have colloidal properties and may therefore be used advantageously in any process involving wetting, penetrating, deterging, dispersing, emulsifying, frothing, foaming, ore flotation and kindred phenomena. Since the high molecular weight products of this invention have surface-tension lowering properties, they may be utilized in many of the technical applications of surface-active compounds. The products of this invention have special value as detergents and wetting agents, as dry-cleaning soaps, as mold inhibitors, and as textile softening agents.

The acids and esters of this new class of organic phosphorus derivatives have a varied and beneficial action as lubricant addition agents and modifying agents for motor fuel, for example, as metal deactivators and the like. The action of phosphonic acids as metal deactivators in motor fuels is disclosed in copending application Serial Number 302,856, filed November 4, 1939, by Elmer K. Bolton.

The above description and examples are intended to be illustrative only. Any modification of or variation therefrom which conforms to the spirit of the invention is intended to be included within the scope of the claims.

We claim:

1. An organic compound of quinquevalent phosphorus wherein one valence of the phosphorus is attached to an organic radical containing no elements other than carbon, hydrogen and oxygen and having at least ten carbon atoms through a carbon atom which is also attached to a hydroxyl group and to two other carbons at least one of which forms part of an open-chain aliphatic radical, two other valences of the phosphorus being attached to one oxygen atom.

2. Tertiary alpha-hydroxyphosphonates of the formula

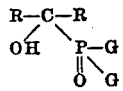

wherein the radicals R are organic radicals containing no elements other than carbon, hydrogen and oxygen, R—C—R contains at least ten carbon atoms, at least one of the organic radicals R is an aliphatic radical, G is a member of the class consisting of OH, OM, R, and OR, and M is a cation of the class consisting of hydrogen and salt-forming atoms and groups.

3. An organic compound of quinquevalent phosphorus wherein one valence of the phosphorus is attached to an organic radical containing no elements other than carbon, hydrogen and oxygen and having at least ten carbon atoms through a carbon atom which is also attached to a hydroxy group and to two other carbons at least one of which forms part of an open-chain aliphatic radical, two other valences of the phosphorus being attached to one oxygen atom, the remaining valences of the phosphorus being satisfied by hydroxyl groups.

4. A salt of a compound according to claim 3.

5. A water-soluble salt of a compound according to claim 3.

6. An alkali-metal water-soluble salt of a compound according to claim 3.

7. A sodium salt of a compound according to claim 3.

8. Process which comprises reacting a ketone of at least ten carbon atoms having at least one open-chain aliphatic radical attached to the carbonyl group with a bromide or chloride of tervalent phosphorus, all valences of which are satisfied by single bonds, preferably in the presence of a low molecular weight organic monocarboxylic acid or anhydride.

9. Process which comprises reacting phosphorus trichloride with a ketone of at least ten carbon atoms having at least one open-chain aliphatic radical attached to the carbonyl compound in the presence of a low molecular weight organic monocarboxylic acid.

10. Process which comprises reacting phosphorus trichloride with a ketone of at least ten carbon atoms having at least one open-chain aliphatic radical attached to the carbonyl compound in the presence of acetic anhydride.

11. Process which comprises reacting a ketone of at least ten carbon atoms having at least one open-chain aliphatic radical attached to the carbonyl group with a bromide or chloride of tervalent phosphorus, all valences of which are satisfied by single bonds, preferably in the presence of a low molecular weight organic monocarboxylic acid or anhydride, and treating the resulting product with water.

12. Process which comprises reacting a ketone of at least ten carbon atoms having at least one open-chain aliphatic radical attached to the carbonyl group with a bromide or chloride of tervalent phosphorus, all valences of which are satisfied by single bonds, preferably in the presence of a low molecular weight organic monocarboxylic acid or anhydride, and treating the resulting product with water containing an alkali metal hydroxide.

13. Process which comprises reacting phosphorus trichloride with a ketone of at least ten carbon atoms having at least one open-chain aliphatic radical attached to the carbonyl compound in the presence of a low molecular weight organic monocarboxylic aid, and treating the resulting product with aqueous alkali.

14. An organic compound of quinquevalent phosphorus wherein one valence of the phosphorus is attached to an organic radical of at least ten carbon atoms through a carbon atom which is also attached to a hydroxyl group and to two other carbons each of which forms part of a completely open-chain aliphatic radical, two other valences of the phosphorus being attached to one oxygen atom.

15. Tertiary alpha - hydroxyphosphonates of the formula

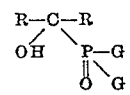

wherein R—C—R contains at least ten carbon atoms, each of the organic radicals R is an aliphatic radical, G is a member of the class consisting of OH, OM, R and OR, and M is a cation of the class consisting of hydrogen and salt-forming atoms and groups.

16. An organic compound of quinquevalent phosphorus wherein one valence of the phosphorus is attached to an organic radical of at least ten carbon atoms through a carbon atom which is also attached to a hydroxyl group and to two other carbons each of which forms part of an open-chain aliphatic radical, two other valences of the phosphorus being attached to one oxygen atom, the remaining valences of the phosphorus being satisfied by hydroxyl groups.

17. A salt of the compound according to claim 16.

18. An alkali metal salt of a compound according to claim 16.

19. A sodium salt of a compound according to claim 16.

20. An organic compound of quinquevalent phosphorus wherein one valence of the phosphorus is attached to a hydrocarbon radical of at least ten carbon atoms through a carbon atom which is also attached to a hydroxyl group and to two other carbons at least one of which forms part of an open-chain aliphatic radical, two other valences of the phosphorus being attached to one oxygen atom.

21. Tertiary alpha - hydroxyphosphonates of the formula

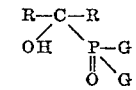

wherein R—C—R contains at least ten carbon atoms, at least one of the hydrocarbon radicals R is an aliphatic radical, G is a member of the class consisting of OH, OM, R and OR, and M is a cation of the class consisting of hydrogen and salt-forming atoms and groups.

22. An organic compound of quinquevalent phosphorus wherein one valence of the phosphorus is attached to a hydrocarbon radical of at least ten carbon atoms through a carbon atom which is also attached to a hydroxyl group and to two other carbons at least one of which forms part of an open-chain aliphatic radical, two other valences of the phosphorus being attached to one oxygen atom, the remaining valences of the phosphorus being satisfied by hydroxyl groups.

23. A salt of a compound according to claim 22.

24. A water-soluble salt of a compound according to claim 22.

25. A sodium salt of a compound according to claim 22.

26. An alkali-metal water-soluble salt of a compound according to claim 22.

27. Disodium 8-hydroxy-8-pentadecanephosphonate.

28. Dipotassium 1-xylyl-1-hydroxy-1-octadecanephosphonate.

29. A derivative of oiticica oil wherein the keto oxygens of the oiticica oil are each replaced by one hydroxyl group and one $Na_2O_3P$-group.

PHILIP GREELEY STEVENS.
HOWARD SINCLAIR TURNER.

CERTIFICATE OF CORRECTION.

Patent No. 2,254,124.   August 26, 1941.

PHILIP GREELEY STEVENS, ET AL.

It is hereby certified that error appears in the printed specification of the above numbered patent requiring correction as follows: Page 1, first column, line 14-15, for "imparts" read --impart--; page 3, second column, line 17, for "tetramethyltridencan" read --tetramethyltridecan--; page 4, first column, line 12, for "ketone" read --ketones--; line 46, for "dacan-1-ol" read --decan-1-ol--; page 5, first column, line 22-23, claim 3, for "hydroxy" read --hydroxyl--; and second column, line 4, claim 13, for the word "aid" read --acid--; and that the said Letters Patent should be read with this correction therein that the same may conform to the record of the case in the Patent Office.

Signed and sealed this 18th day of November, A. D. 1941.

(Seal)

Henry Van Arsdale,
Acting Commissioner of Patents.